(12) United States Patent
Salter et al.

(10) Patent No.: US 10,989,500 B2
(45) Date of Patent: Apr. 27, 2021

(54) VEHICLE ASSEMBLY VEHICLE COVER AND LIGHTING ASSEMBLY DISPOSED OVER A LIGHT OF THE VEHICLE, AND VEHICLE LIGHTING METHOD

(71) Applicant: Ford Global Technologies, LLC, Dearborn, MI (US)

(72) Inventors: Stuart C. Salter, White Lake, MI (US); David Brian Glickman, Southfield, MI (US); Daniel Martin, Plymouth, MI (US); Paul Kenneth Dellock, Northville, MI (US); Zeljko Deljevic, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 40 days.

(21) Appl. No.: 16/264,840

(22) Filed: Feb. 1, 2019

(65) Prior Publication Data

US 2020/0248987 A1 Aug. 6, 2020

(51) Int. Cl.
*B60J 11/04* (2006.01)
*F41H 3/00* (2006.01)
(Continued)

(52) U.S. Cl.
CPC ............... *F41H 3/00* (2013.01); *B60J 11/00* (2013.01); *B60Q 1/30* (2013.01); *B60Q 1/34* (2013.01);
(Continued)

(58) Field of Classification Search
CPC ... B60J 11/04; B60Q 1/22; B60Q 1/24; B60Q 7/02
See application file for complete search history.

(56) References Cited

U.S. PATENT DOCUMENTS 4,589,459 A * 5/1986 Lantrip .................... B60J 11/06
150/166
4,612,967 A * 9/1986 Kamen .................... B60J 11/00
150/166
(Continued)

FOREIGN PATENT DOCUMENTS

CN 204161068 2/2015
DE 10109050 9/2002
(Continued)

*Primary Examiner* — Ismael Negron
(74) *Attorney, Agent, or Firm* — David Coppiellie, Esq.; Carlson, Gaskey & Olds, P.C.

(57) ABSTRACT

A vehicle assembly includes a camouflaging cover configured to be placed over an exterior surface of a vehicle to conceal at least a portion of the vehicle, and a camouflaging lighting assembly integrated with the camouflaging cover and positioned over a light of the vehicle. The vehicle lighting assembly includes at least one light emitting device, a circuit board operatively connected to the at least one light emitting device, a housing having a first material composition, and at least one lens having a second material composition, such lens being more transparent than the housing. The first and second material compositions each includes a thermally conductive additive. The vehicle lighting method includes the steps of concealing at least a portion of a vehicle with the camouflaging cover, and positioning a camouflaging lighting device over a light of the vehicle.

16 Claims, 5 Drawing Sheets

(51) Int. Cl.
*F21S 43/14* (2018.01)
*F21S 43/20* (2018.01)
*B60J 11/00* (2006.01)
*B60Q 1/30* (2006.01)
*B60Q 1/34* (2006.01)
*B60Q 1/44* (2006.01)
*F21Y 115/10* (2016.01)

(52) U.S. Cl.
CPC ................ *B60Q 1/44* (2013.01); *F21S 43/14* (2018.01); *F21S 43/26* (2018.01); *F21Y 2115/10* (2016.08)

(56) References Cited

U.S. PATENT DOCUMENTS

| | | | | |
|---|---|---|---|---|
| 4,938,522 | A * | 7/1990 | Herron | B60J 11/00 150/166 |
| 5,112,098 | A * | 5/1992 | Lichtmann | B60J 11/00 296/136.07 |
| 5,528,474 | A * | 6/1996 | Roney | F21S 45/47 362/545 |
| 5,549,938 | A * | 8/1996 | Nesbitt | F41H 3/00 296/191 |
| 5,605,369 | A * | 2/1997 | Ruiz | B60J 11/06 150/166 |
| 5,944,347 | A * | 8/1999 | Pechman | B60R 13/04 280/770 |
| 6,312,145 | B1 * | 11/2001 | Rhoad | F21S 48/155 362/311.14 |
| 6,371,547 | B1 * | 4/2002 | Halbrook | B60J 11/00 150/166 |
| 6,491,335 | B1 * | 12/2002 | Cohill | B60J 11/00 150/166 |
| 6,520,669 | B1 * | 2/2003 | Chen | F21S 41/143 362/545 |
| 6,577,358 | B1 * | 6/2003 | Arakawa | G02B 3/0031 349/57 |
| 6,588,827 | B2 * | 7/2003 | Heiland | B60J 11/00 150/166 |
| 7,100,965 | B1 * | 9/2006 | Stover | B60J 11/00 296/136.03 |
| 8,007,155 | B2 | 8/2011 | Bolander, Jr. et al. | |
| 9,500,333 | B1 * | 11/2016 | Johnson | F21S 41/275 |
| 9,707,884 | B2 | 7/2017 | Ekladyous et al. | |
| 9,810,401 | B2 * | 11/2017 | Salter | F21V 9/32 |
| 2002/0007888 | A1 * | 1/2002 | Gregorek | B60J 11/00 150/166 |
| 2015/0183365 | A1 * | 7/2015 | Aboughanem | B60J 11/06 362/520 |
| 2015/0268003 | A1 | 9/2015 | Bazinski et al. | |
| 2017/0341571 | A1 * | 11/2017 | Salter | B60Q 1/323 |
| 2018/0313513 | A1 * | 11/2018 | Park | B60Q 1/2696 |

FOREIGN PATENT DOCUMENTS

| | | | | |
|---|---|---|---|---|
| DE | 102010050409 | | 6/2011 | |
| JP | 2004-228047 | A * | 8/2004 | ............ H01M 2/10 |
| TW | D186473 | | 11/2017 | |

* cited by examiner

VEHICLE ASSEMBLY VEHICLE COVER AND LIGHTING ASSEMBLY DISPOSED OVER A LIGHT OF THE VEHICLE, AND VEHICLE LIGHTING METHOD

TECHNICAL FIELD

This disclosure relates generally to vehicle lighting and, more particularly, to a lighting assembly for a vehicle. In an exemplary embodiment, the lighting assembly is integrated with a camouflaging cover for the vehicle.

BACKGROUND

Vehicles can include various lighting assemblies, such as headlights and taillights. The lighting assemblies can illuminate areas within or near the vehicle. The illumination of the lighting assemblies can integrate movements of the vehicle, such as the vehicle braking or turning. Other lighting assemblies are primarily decorative, such as illuminated badges that can help to identify a model of the vehicle.

Camouflage can be used conceal the shape or other geometric and visual details of new, test, and/or prototype vehicles and other products. Camouflage for vehicles is often designed so that illumination from the lighting assemblies of the vehicle can remain visible to an observer. Regulations may require that the vehicles include visible lighting devices, even when the vehicles are camouflaged.

For example, referring to FIGS. 1 and 2, a prior art vehicle 10 can include areas selectively concealed by a plurality of camouflaging covers 14. The camouflaging covers 14 conceal, among other things, geometric details of the vehicle 10 when the vehicle 10 is driven in public areas. The camouflaging covers 14 at a rear of the vehicle 10 includes areas with openings 18. Due to the openings 18, an observer can view illumination from taillights 22 of the vehicle 10 even when the camouflaging covers 14 are attached to the vehicle 10.

The openings 18, however, may permit the observer to undesirably identify features of the vehicle 10. For example, the observer may understand geometric and styling details related to the taillights 22 by looking through the openings 18.

SUMMARY

A vehicle assembly according to an exemplary aspect of the present disclosure includes, among other things, a camouflaging cover configured to be placed over an exterior surface of a vehicle to conceal at least a portion of the vehicle, and a camouflaging lighting assembly integrated with the camouflaging cover.

In another example of the foregoing vehicle assembly, the camouflaging lighting assembly is held within a pocket of the camouflaging cover.

In another example of any of the foregoing vehicle assemblies, the camouflaging lighting assembly is disposed over a light of the vehicle.

In another example of any of the foregoing vehicle assemblies, the light of the vehicle is a taillight.

In another example of any of the foregoing vehicle assemblies, the camouflaging lighting assembly is configured to communicate thermal energy outwards away from the vehicle.

In another example of any of the foregoing vehicle assemblies, the camouflaging lighting assembly includes at least one light emitting diode, a circuit board, a housing having a first material composition, and at least one lens having a second material composition. The first and second material compositions are polymer-based and include a thermally conductive additive.

In another example of any of the foregoing vehicle assemblies, the housing and the at least one lens are overmolded about the at least one light emitting diode and about the circuit board.

In another example of any of the foregoing vehicle assemblies, the at least one lens is more transparent than the housing.

A vehicle lighting assembly according to another exemplary aspect of the present disclosure includes, among other things, at least one light emitting device, a circuit board operatively connected to the at least one light emitting device, a housing having a first material composition, and at least one lens having a second material composition. The lens is more transparent than the housing. The first and second material compositions each includes a thermally conductive additive.

In another example of the foregoing vehicle assembly, the thermally conductive additive of the first material composition and of the second material composition is a thermally conductive ceramic.

In another example of any of the foregoing vehicle assemblies, the first and second material compositions include silicone rubber, and the thermally conductive additive of the first and second material compositions is boron nitride.

In another example of any of the foregoing vehicle assemblies, the at least one lens is overmolded about at least a portion of the at least one light emitting device.

Another example of any of the foregoing vehicle assemblies, includes a camouflaging cover configured to be placed over an exterior surface of a vehicle to conceal at least a portion of the vehicle. The housing is held by the camouflaging cover such that the at least one light emitting device is disposed over a light of the vehicle when the camouflaging cover is secured to the vehicle.

Another example of any of the foregoing vehicle assemblies includes a securing portion of the lighting assembly. The securing portion is configured to secure the lighting assembly to the camouflaging cover such that the housing is held by the camouflaging cover.

A vehicle lighting method according to yet another exemplary aspect of the present disclosure includes, among other things, concealing at least a portion of a vehicle with a camouflaging cover, and positioning a camouflaging lighting device over a light of the vehicle. The camouflaging lighting device is integrated with the camouflaging cover.

Another example of the foregoing vehicle lighting method includes communicating thermal energy through an exterior surface of the camouflaging lighting device using a thermally conductive additive of the camouflaging lighting device.

In another example of any of the foregoing vehicle lighting methods, the thermally conductive additive is included in both a lens of the camouflaging lighting device and in a housing of the camouflaging lighting device.

Another example of any of the foregoing vehicle lighting methods includes operatively connecting the camouflaging lighting device to the vehicle such that light emitted from the camouflaging lighting device is controllable from the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a lighting assembly and, in exemplary embodiments, a lighting assembly that is used in connection with a camouflaging cover for a vehicle. The lighting assembly is, notably, configured to conduct thermal energy outward from the lighting assembly and away from an associated vehicle, rather than back toward the vehicle.

Figure 1:
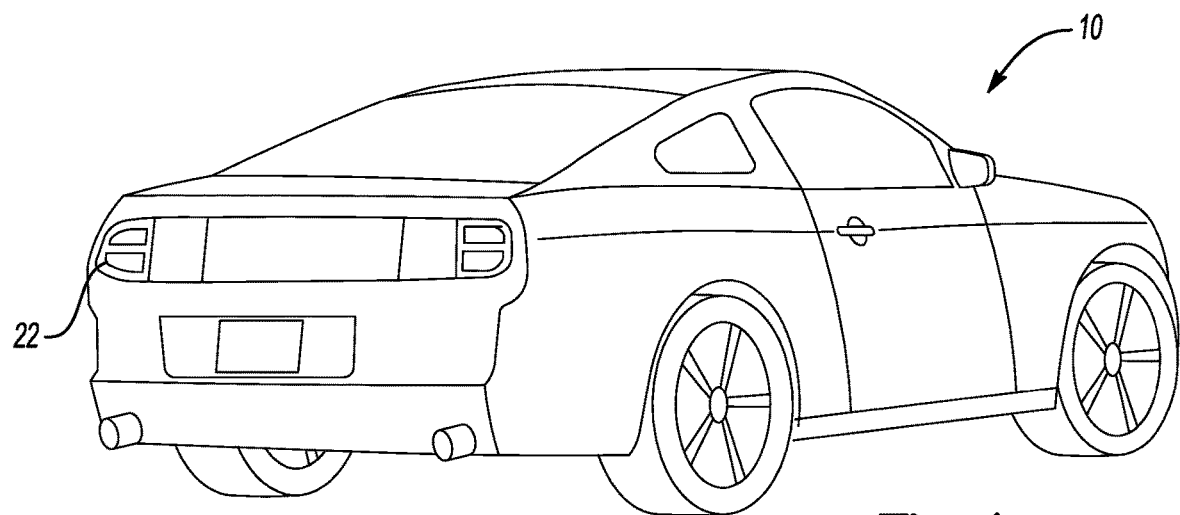
FIG. 1 illustrates a prior art vehicle.
Figure 2:
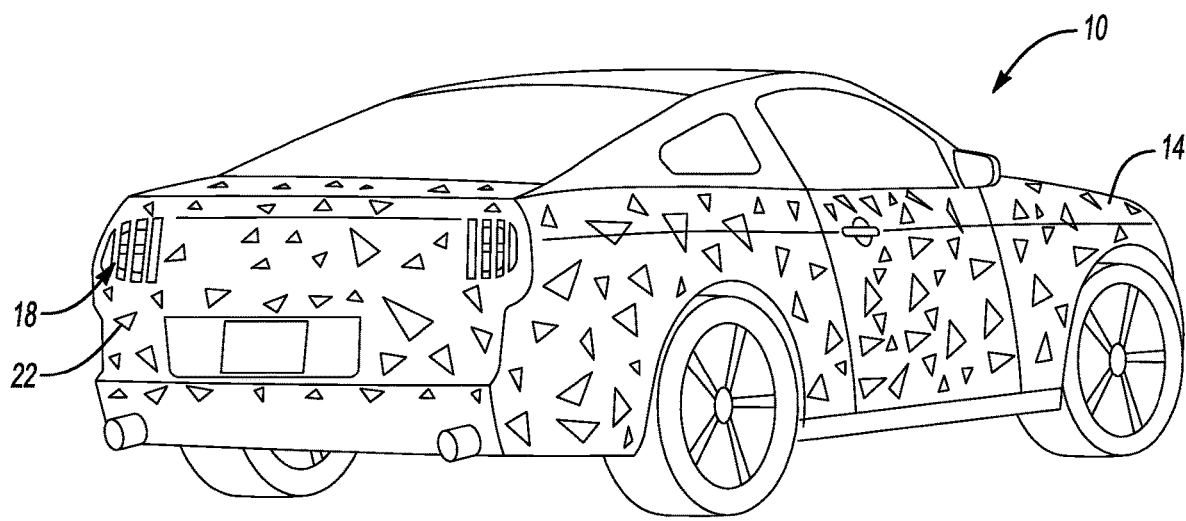
FIG. 2 illustrates portions of the prior art vehicle of FIG. 1 concealed by a plurality of camouflaging covers.
Figure 3:
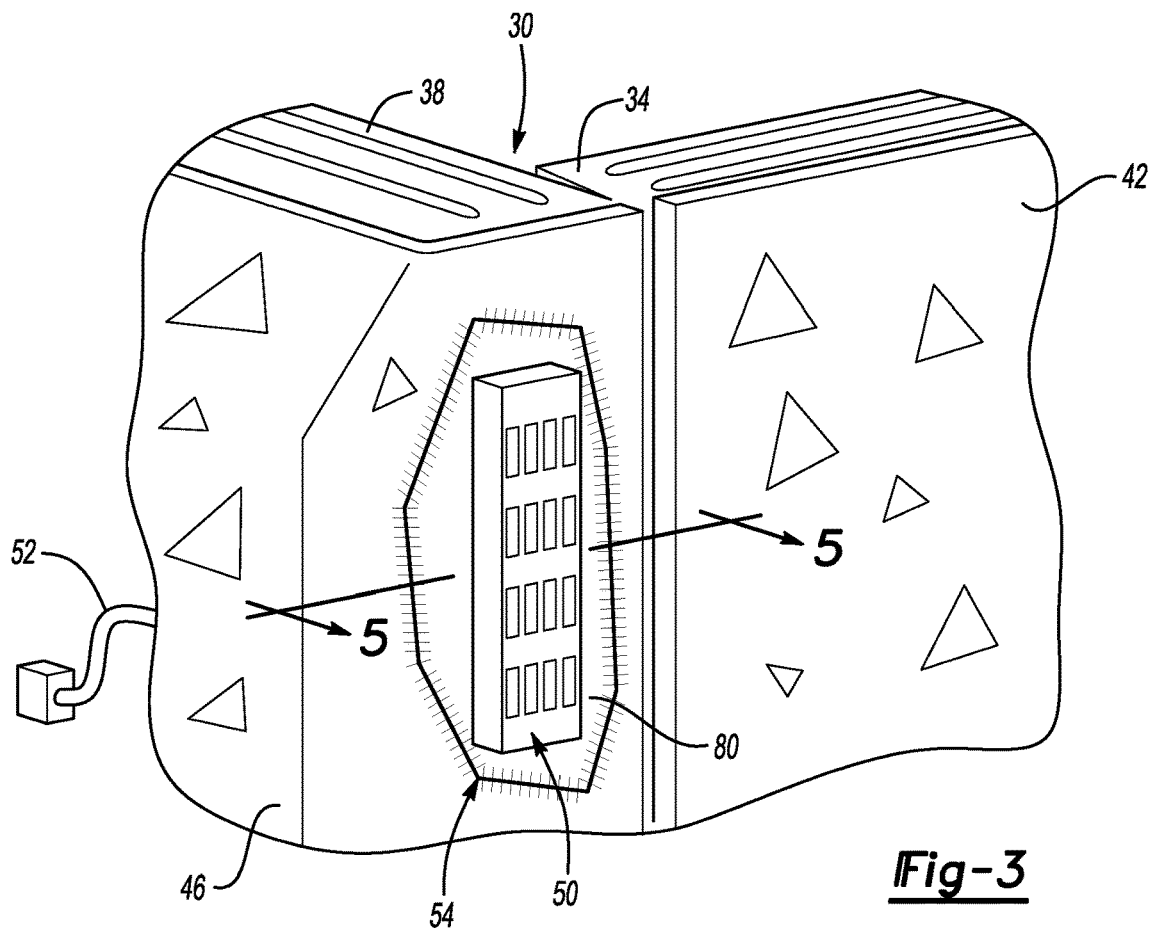
FIG. 3 illustrates a camouflaging cover concealing a portion of a vehicle according to an exemplary aspect of the present disclosure.
Figure 4:
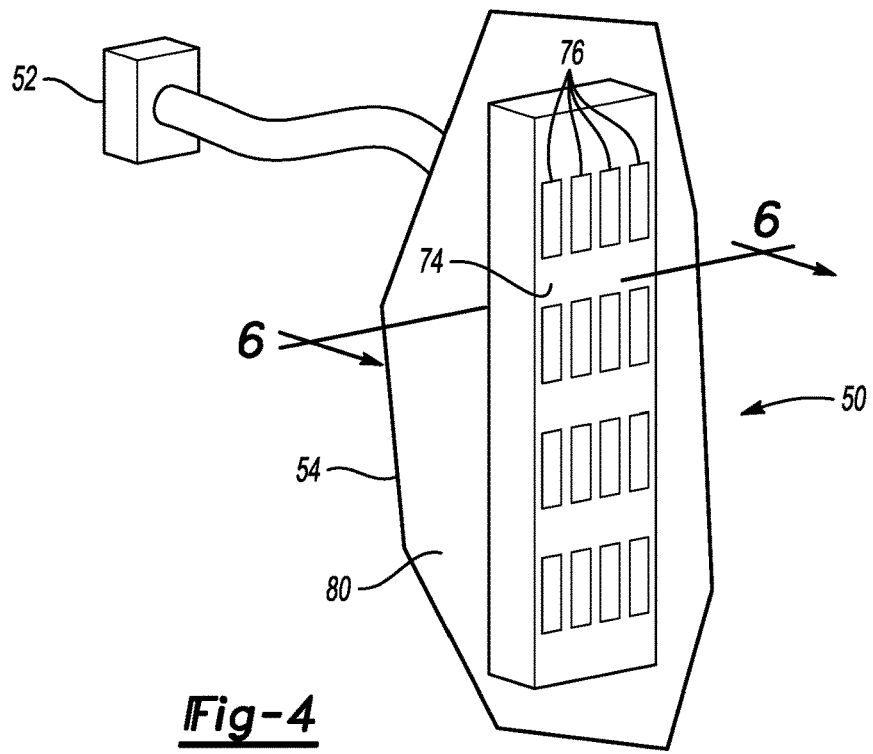
FIG. 4 illustrates a lighting assembly integrated with the camouflaging cover of FIG. 3

Referring to FIGS. 3 and 4, a rear driver side area of a vehicle 30, here a truck, includes a tailgate 34 and a rear quarter panel 38. An outermost, exterior surface of the tailgate 34 is covered by a camouflaging cover 42. An outermost, exterior surface of the rear quarter panel 38 is covered by a camouflaging cover 46.

In the exemplary embodiment, the camouflaging covers 42, 46 are polymer-based panels. The camouflaging covers 42, 46 could be, for example, a high-heat, somewhat flexible, polymer-based material. The camouflaging covers 42, 46 can be secured to the vehicle 30 with, for example, hook-and-loop style connectors, mechanical connectors, or an adhesive.

A lighting assembly 50 is integrated with the camouflaging cover 46 as part of a vehicle assembly. Because the lighting assembly 50 is integrated with the camouflaging cover 46 and used to camouflage portions of the vehicle 30, the lighting assembly 50 is considered a camouflaging lighting assembly.

In this exemplary embodiment, the lighting assembly 50 is directly attached to remaining portions of the camouflaging cover 46 with a sewn seam 54. In another example, the lighting assembly 50 can be integrated with the remaining portions of the camouflaging cover 46 by placing the lighting assembly 50 within a pocket of the camouflaging cover 46.

A takeout 52 can be used to electrically connect the lighting assembly 50 to the vehicle 30. At least a portion of the takeout 52 can run between the camouflaging cover 46, and the panel 38, and then extend through an opening in the camouflaging cover 46 to electrically connect to the lighting assembly 50.

In other examples, the lighting assembly 50 is a stand-alone lighting device that is not integrated within the camouflaging cover 46 or any other camouflaging cover. The stand-alone lighting assembly could be, for example, temporarily positioned on an exterior or within an interior of a vehicle to provide that vehicle with an additional lighting device. The stand-alone lighting assembly could be, for example, positioned on a dash of the vehicle within a passenger compartment of the vehicle, or adhered to a window or outer panel of the vehicle. The stand-alone lighting assembly may be utilized to notify observers that the vehicle is operating as part of a ride-hailing service and that the driver of the vehicle is accepting rides. When the driver is no longer accepting rides as part of the ride-hailing service, the stand-alone lighting assembly could be removed and stored away.

In another example of the lighting assembly 50 as a stand-along lighting device, the lighting assembly 50 could be adhesively, or otherwise, secured over a light of a vehicle to customize an appearance of the vehicle.

Figure 5:
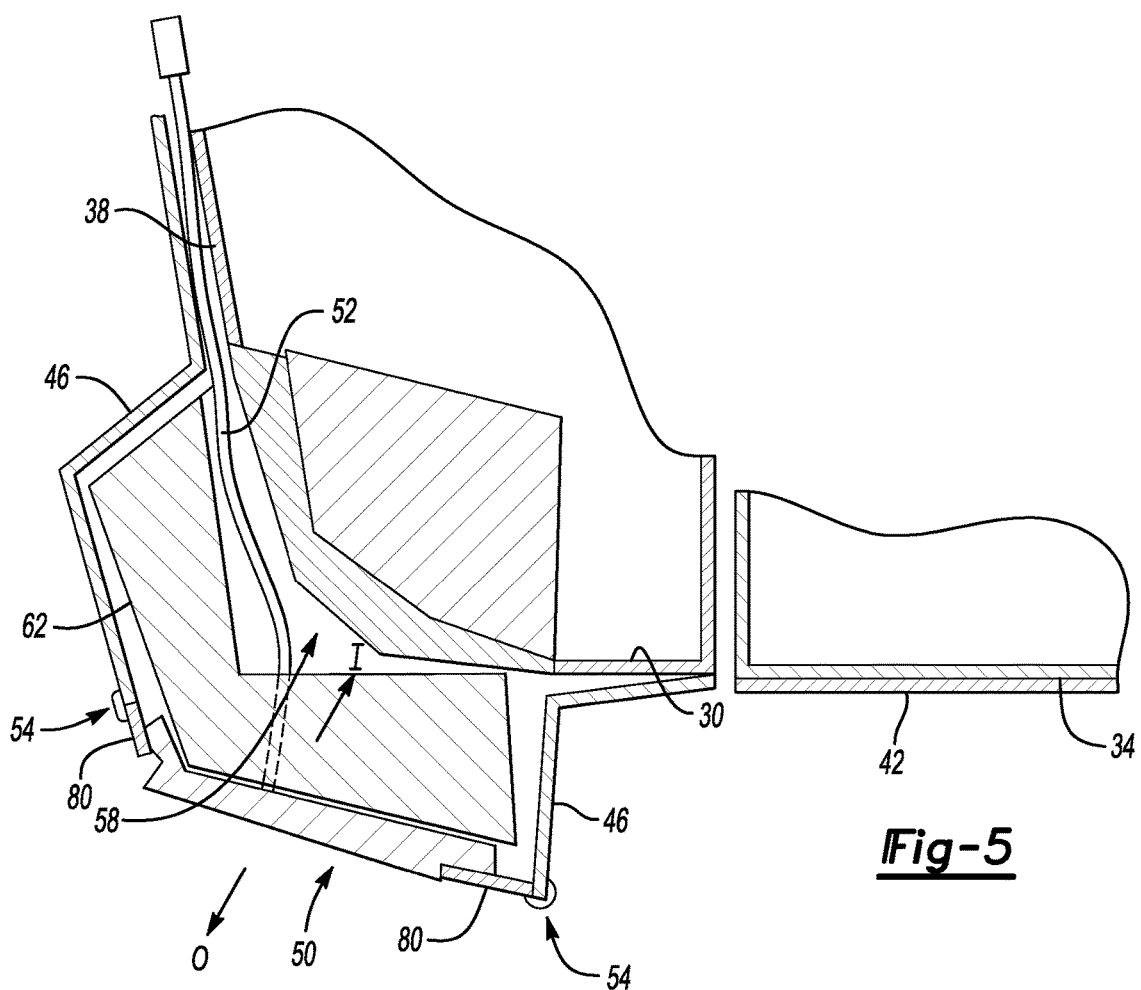
FIG. 5 illustrates a section, and partially schematic, view taken at line 5-5 in FIG. 3.

With reference now to FIG. 5 and continuing reference to FIG. 3, the lighting assembly 50, when integrated with the camouflaging cover 46 mounted to the vehicle 30, is positioned over a rear taillight 58 of the vehicle 30. A spacer block 62 can be used to bump out the lighting assembly 50 and portions of the camouflaging cover 46 to conceal contours and other visual aspects of the vehicle 30. The spacer block 62 can be adhesively secured to the vehicle 30, the camouflaging cover 46, or both. The spacer block 62 can be foam. In some examples, the spacer block 62 can be used as a heat sink for the lighting assembly 50.

The spacer block 62 and lighting assembly 50 can be adapted for specific vehicles while keeping common the flexible portions of the camouflaging cover 46. The lighting assembly 50 is relatively thin and flexible, which facilitates integrating the lighting assembly 50 with the camouflaging cover 46, as well as concealing portions of the vehicle 30, such as the taillight 58, with the lighting assembly 50. The lighting assembly 50 can be flexed around different geometries of taillights, for example.

Figure 6:
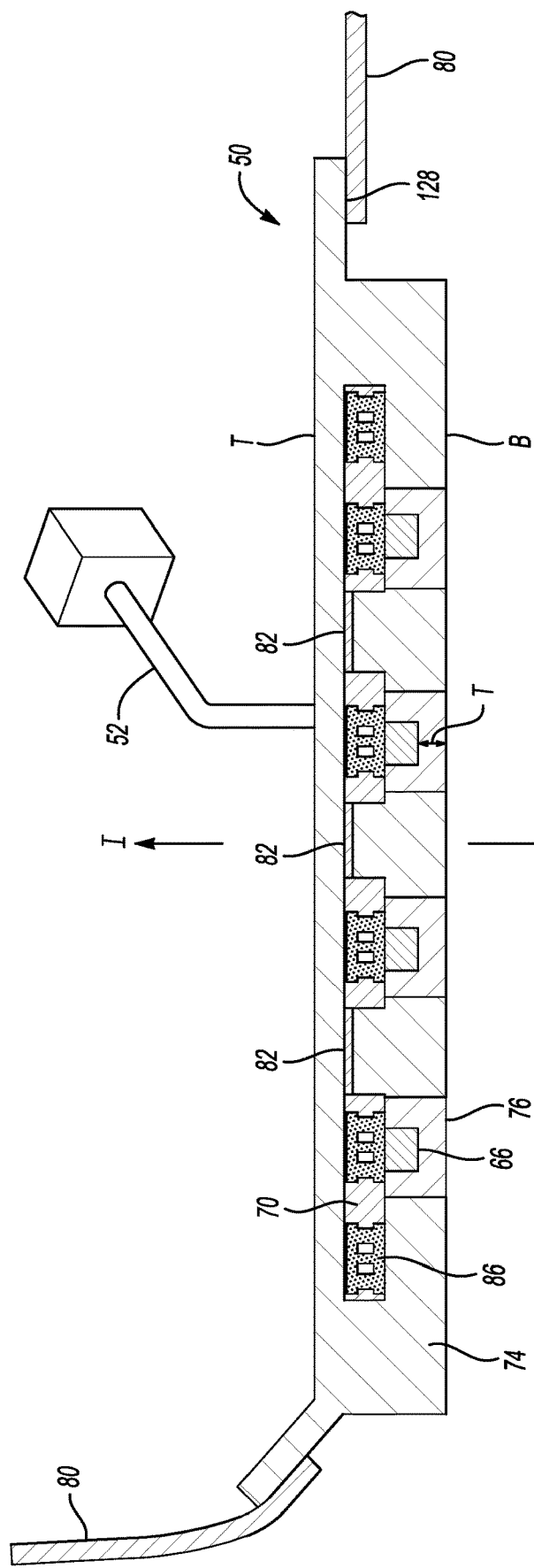
FIG. 6 illustrates a section view taken at line 6-6 in FIG. 4.

Referring to FIG. 6 with continuing reference to FIG. 5, the lighting assembly 50 includes at least one light emitting device 66, a circuit board 70 that is operatively connected to the at least one light emitting device 66, a housing 74, and a lens 76 associated with each of the light emitting devices 66. A securing portion 80 is attached to the housing 74. The securing portion 80 is sewn to the camouflaging cover 46 to integrate the lighting assembly 50 with the camouflaging cover 46. The securing portion 80 could be omitted if the lighting assembly 50 is attached relative to the vehicle 30 in another way.

In the exemplary embodiment, the light emitting devices 66 are light emitting diodes (LEDs) that are arranged in a 2×4 array. The circuit board 70 is a thin printed circuit board operatively connected to the light emitting devices 66. The circuit board 70 is configured to control the illumination from the light emitting devices 66 in response to a command from the vehicle 30 that is communicated to the lighting assembly 50 through the takeout 52. Flexible printed circuit board connections 82 can be used within the lighting assembly 50 to operatively connect portions of the circuit board 70, as required.

The light emitting devices 66 can light up in various sequences depending on a signal received from the vehicle 30 to indicate that the vehicle 30 is turning or braking, or simply to illuminate the rear area of the vehicle 30. The light emitting devices 66 can, for example, selectively illuminate to indicate to an observer outside the vehicle 30 that the vehicle 30 is braking. If the lighting assembly 50 is a stand-alone lighting assembly (i.e., not integrated within the camouflaging cover 46) the lighting assembly 50 could operate based on signals received from a designated controller module within the vehicle 30. The designated controller module can communicate over a CAN network of the vehicle 30.

The lighting assembly 50 can generate thermal energy when illuminating and during other operations. The lighting assembly 50 incorporates features that facilitate directing thermal energy outward in a direction O away from the vehicle 30 rather than back inward in a direction I toward the vehicle 30. Communicating thermal energy outward in a direction O can avoid undesirable buildup of thermal energy in the area behind the lighting assembly 50, which is in the area of the spacer block 62 in this example.

The taillight 58 does not, in the exemplary embodiment, include features to direct thermal energy outward in the direction O. There are considerably open areas behind the panel 38, so the taillight 58 can generally direct thermal energy generated during operation back in the direction I without issue. Features of the example lighting assembly 50 that facilitate directing thermal energy outward in the direction O include incorporating thermally conductive additives into certain areas.

For example, the housing 74 has a first material composition that includes a base material and a thermally conductive additive. In an exemplary embodiment, the first material composition comprises silicone rubber and a boron nitride thermally conductive additive. The silicone rubber, in a specific exemplary embodiment, can be a polydimethylsiloxane.

The first material composition of the housing 74 can further including a color tint that tints the housing 74 such that the housing 74 is opaque. The color of boron nitride is naturally bright white, but adding the color tint can change the housing 74 to be black or another color as desired.

In the exemplary embodiment, the first material composition of the housing 74 is from 30 to 40 percent by weight boron nitride, which can increase the thermal conductivity of the housing 74 above silicone rubber from about 0.2 watt per meter Kelvin to about 3 watt per meter Kelvin while keeping the electrical volume resistivity above 7E+12 Ohm centimeters. The boron nitride also acts as a reflector to enhance the intensity of light from the lighting emitting devices 66.

The exemplary lenses 76 have a second material composition that is more transparent than the housing 74. The lenses 76 have a second material composition that can include boron nitride as a thermally conductive material, along with a base material that is a clear silicone. The lenses 76 thus also include a thermally conductive additive that, like the housing 74, is boron nitride.

The lenses 76 having the second material composition, when cured, provide a slightly milky white light diffusing material that has a thermal conductivity of about 0.75 watt per meter Kelvin. The addition of the boron nitride to clear silicone can increase a thermal conductivity of the second material composition by about three times over clear silicone.

In an exemplary embodiment, a maximum thickness T of the lenses 76 is kept relatively thin, and possibly 0.5 millimeters or less. The relatively thin lenses 76 facilitate relatively quick dissipation of thermal energy through the lenses 76 and can facilitate passage of light from the light emitting devices 66 through the lenses 76.

In this example, an exterior surface of the lenses 76 is aligned with an exterior surface of the housing 74. The lenses 76, in another example, could be domed to protrude outward past the exterior surface of the housing 74.

The thermally conductive material within the housing 74 and the lenses 76 facilitates the transfer of thermal energy generated during operation of the lighting assembly 50 outward from the lighting assembly in the direction O.

The exemplary lighting assembly 50 further includes a plurality of copper pads 86 and vias, which can further facilitate transfer of thermal energy outward from the lighting assembly 50 in the direction O. The copper pads 86 and vias, in particular, facilitate thermal energy transfer from the circuit board 70 to the thermally conductive material within the housing 74 and within the lenses 76.

Figure 7:
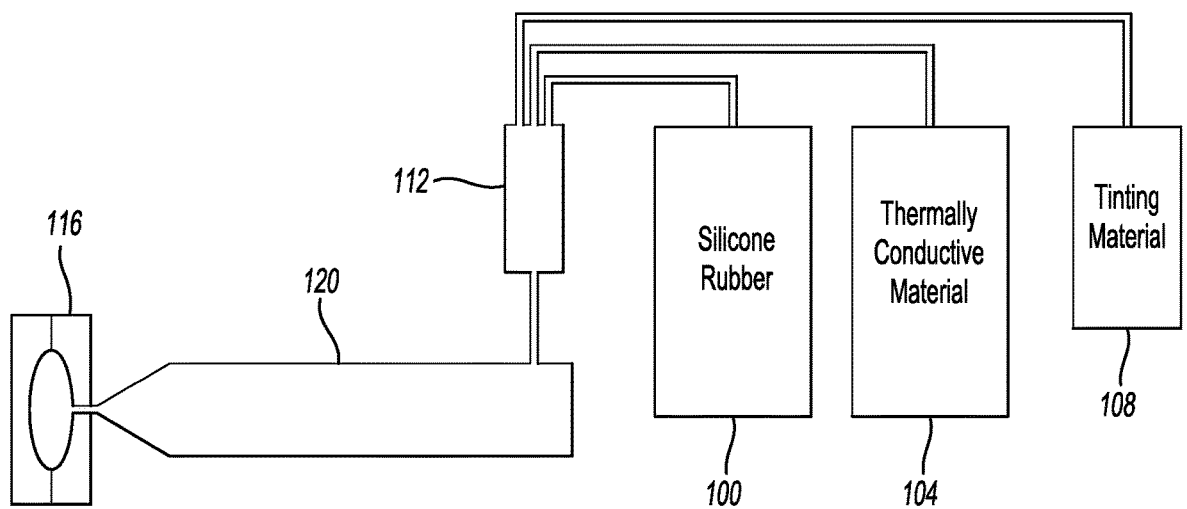
FIG. 7 illustrates a schematic view of a molding process used to provide portions of the lighting assembly of FIG. 4.

In the exemplary embodiment, the lenses 76 and the housing 74 are overmolded about at least a portion of the light emitting devices 66. The overmolding process for the housing 74, as shown in FIG. 7, can include a supply of silicone rubber 100, a supply of a thermally conductive material 104, and a supply of a tint 108. Materials from the supplies are communicated to a static mixer 112 and then injected into a mold 116 containing the light emitting devices 66, the circuit board 70, and the copper pads 86 and vias. A screw and barrel 120 injects the material from the static mixer 112, in this embodiment.

In the exemplary embodiment, the pressures used to inject the materials for the overmolding are from 500 to 900 pound-force per square inch. The material mixture is shot cold by the screw and barrel 120 into the mold 116, which is heated to typically around 150 degrees Celsius. These pressures and temperatures are relatively low. Keeping the pressures and temperatures involved in the silicone liquid overmolding process relatively low, can help to prevent damage to the light emitting devices 66 and other electronic components about which the material mixture is overmolded. Other, more typical, injection molding process using about pressures that are from 8000 to 10000 pound-force per square inch. Further, thermoplastic vulcanizates (TPVs) are typically shot at temperatures around 220 degrees Celsius.

In this example, the housing 74 is shot prior to the lenses 76. The circuit board 70 is positioned within the mold during the overmolding process such that the circuit board 70 ends up disposed within the housing 74 rather than at the top T or bottom B of the housing 74, which can reduce physical stress introduced to the circuit board 70 due to flexing of the lighting assembly 50.

After overmolding the housing 74 about the circuit board 70, the light emitting devices 66, and the copper pads 86 and vias, the assembly can be repositioned in a second tool, where the lenses 76 are overmolded about each of the light emitting devices 66. The material composition of the lenses 76 is, in this example, from 5 to 10 percent boron nitride.

The housing 74 is molded to include flanges 128 which are then used to secure the lighting assembly 50, in some examples, to the camouflaging cover 46 or the securing portion 80. The lighting assembly 50 can be attached to the camouflaging cover 46 by placement in a pocket of the camouflaging cover 46, by a sewn seam as previously described, by a zipper, or by a hook-and-loop type connection.

Figure 8:
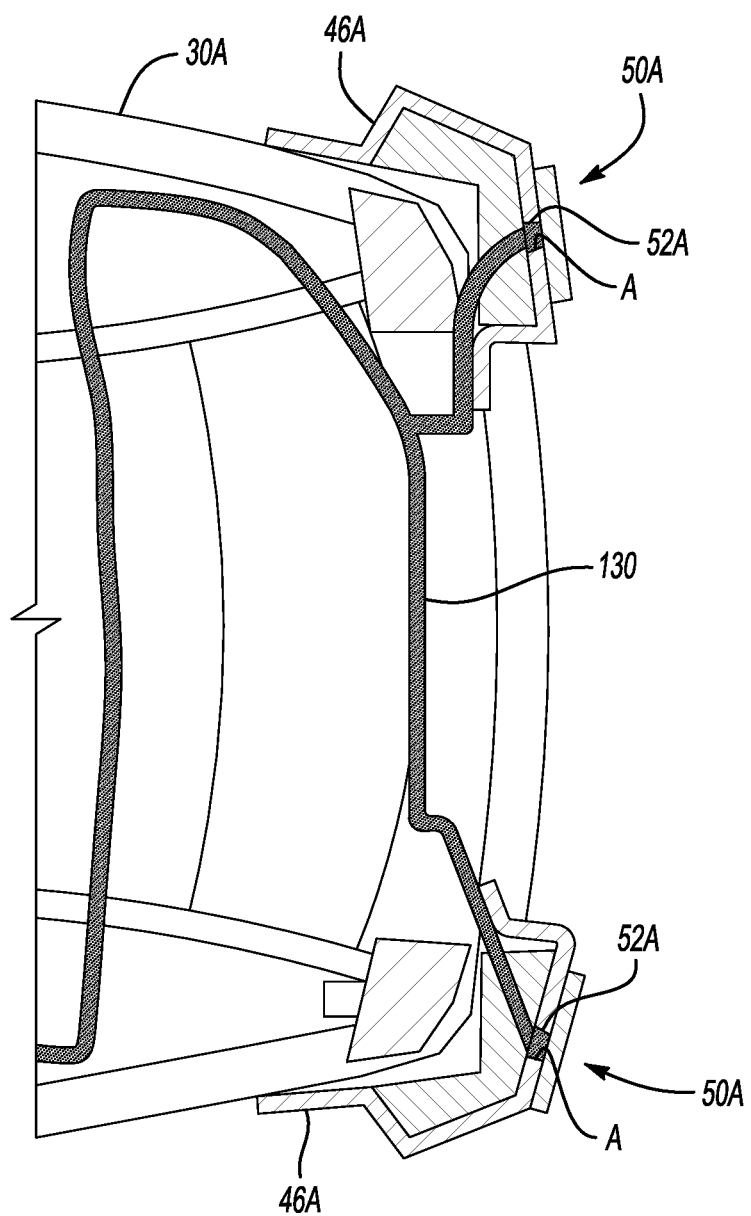
FIG. 8 illustrates a top, section view of camouflaging covers secured to portion of a vehicle according to another exemplary aspect of the present disclosure.

Takeouts 52A, as shown in the exemplary embodiment of FIG. 8, can be used to electrically couple respective lighting assemblies 50A to an electrical harness 130 of a vehicle 30A. In some examples, each takeout 52A extends through an aperture A within camouflaging covers 46A secured to the vehicle 30A. The aperture A can be positioned behind the lighting assembly 50 such that the connection between the takeout 52A and the electrical harness 130 of the vehicle 30A is hidden from view.

Electrically coupling the lighting assemblies 50A to the vehicle 30A enables the lighting assemblies 50A to respond to commands from the vehicle 30A. For example, the lighting assemblies 50A can illuminate in response to a braking of the vehicle 30A.

A pigtail type connector could be used to electrically couple the takeouts 52A to the electrical harness 130 of the vehicle 30A. The pigtail could include a flat wire cable extending to a hardware connector associated with a taillight of the vehicle 30A. The flat wire cable could be configured to extend through a trunk or hatch opening such that the trunk or hatch can shut as the flat wire cable compresses a rubber weatherstripping about the trunk or hatch opening. Thus, when the trunk or hatch is closed, the lighting assemblies 50A can remain electrically coupled to the vehicle.

In some examples, the takeouts 52A are electrically connected to a trailer connector of a vehicle. For example, a vehicle could include a four/seven pin electrically connector to a trailer. When the takeouts 52A connect to the trailer connector, at least one of the pins can power the lighting assemblies 50A.

Connecting the takeouts 52A to the trailer connector may mean that access to taillights of the vehicle do not need to be removed from the vehicle to electrically connect the takeouts 52A to the vehicle.

A jumper harness can be used to electrically connect the takeouts 52A to the trailer connector. A person skilled in this art and having the benefit of this disclosure could be able to design such a jumper harness.

In an exemplary embodiment, a central connector is used to electrically connect both takeouts 52A to the vehicle 30A. The central connector can provide a quick electrically disconnect of the lighting assemblies 50A when the camouflaging covers 46A need to be removed from the vehicle 30A in order to, for example, test the vehicle 30A.

Features of the disclosed examples include a lighting assembly including features designed to convey thermal energy outward away from a vehicle. The lighting assembly can include a housing and lenses that are overmolded about electronics, such as light emitting devices. The overmolding can, effectively, seal the electronics.

The overmolding process can utilize relatively low mold pressures to protect against damaging the electronics during molding. The overmolding process can provide a relatively flexible lighting assembly that can conform somewhat to an underlying vehicle body and vehicle light. In an example, the thermally conductive feature includes a boron nitride additive to a base overmold material of polydimethylsiloxane. The boron nitride can increase the thermal conductivity of the base material. The boron nitride can act as a reflector to facilitate getting more perceived light transmitted from the light emitting devices.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   a camouflaging cover configured to be placed over an exterior surface of a vehicle to conceal at least a portion of the vehicle; and
   a camouflaging lighting assembly integrated with the camouflaging cover, the camouflaging lighting assembly disposed over a light of the vehicle.

2. The vehicle assembly of claim 1, the camouflaging cover including a pocket, and wherein the camouflaging lighting assembly is held within the pocket of the camouflaging cover.

3. The vehicle assembly of claim 1, wherein the light of the vehicle is a taillight.

4. The vehicle assembly of claim 1, wherein the camouflaging lighting assembly is configured to communicate thermal energy outwards away from the vehicle.

5. The vehicle assembly of claim 1, wherein the camouflaging lighting assembly includes at least one light emitting diode, a circuit board, a housing having a first material composition, and at least one lens having a second material composition, wherein the first and second material compositions are polymer-based and include a thermally conductive additive.

6. The vehicle assembly of claim 5, wherein the housing and the at least one lens are overmolded about the at least one light emitting diode and about the circuit board.

7. The vehicle assembly of claim 5, wherein the at least one lens is more transparent than the housing.

8. A vehicle lighting assembly, comprising:
   at least one light emitting device;
   a circuit board operatively connected to the at least one light emitting device;
   a housing having a first material composition;
   at least one lens having a second material composition, the at least one lens more transparent than the housing, the first and second material compositions each including a thermally conductive additive; and
   a camouflaging cover configured to be placed over an exterior surface of a vehicle to conceal at least a portion of the vehicle, wherein at least the housing is held by the camouflaging cover such that the at least one light emitting device is disposed over a light of the vehicle when the camouflaging cover is secured to the vehicle.

9. The vehicle lighting assembly of claim 8, wherein the thermally conductive additive of the first material composition and of the second material composition is a thermally conductive ceramic.

10. The vehicle lighting assembly of claim 8, wherein the first and second material compositions comprise silicone rubber, wherein the thermally conductive additive of the first and second material compositions is boron nitride.

11. The vehicle lighting assembly of claim 8, wherein the at least one lens is overmolded about at least a portion of the at least one light emitting device.

12. The vehicle lighting assembly of claim 8, the lighting assembly further comprising a securing portion configured to secure the lighting assembly to the camouflaging cover such that the housing is held by the camouflaging cover.

13. A vehicle lighting method, comprising:
   concealing at least a portion of a vehicle with a camouflaging cover; and
   positioning a camouflaging lighting device over a light of the vehicle, the camouflaging lighting device integrated with the camouflaging cover.

14. The vehicle lighting method of claim 13, further comprising operatively connecting the camouflaging lighting device to the vehicle such that light emitted from the camouflaging lighting device is controllable from the vehicle.

15. The vehicle lighting method of claim 13, further comprising communicating thermal energy through an exterior surface of the camouflaging lighting device using a thermally conductive additive of the camouflaging lighting device.

16. The vehicle lighting method of claim 15, wherein the thermally conductive additive is included in both a lens of the camouflaging lighting device and in a housing of the camouflaging lighting device.

* * * * *